US012477289B2

(12) United States Patent
Garcia et al.

(10) Patent No.: US 12,477,289 B2
(45) Date of Patent: Nov. 18, 2025

(54) APPARATUS HAVING AN INSERT FOR TESTING AN EARPIECE OF A HEADPHONE

(71) Applicant: Harman International Industries, Incorporated, Stamford, CT (US)

(72) Inventors: Christian Manuel Garcia, Winnetka, CA (US); Alfredo Fernandez Franco, Sherman Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 168 days.

(21) Appl. No.: 18/540,019

(22) Filed: Dec. 14, 2023

(65) Prior Publication Data

US 2025/0203304 A1 Jun. 19, 2025

(51) Int. Cl.
*H04R 29/00* (2006.01)

(52) U.S. Cl.
CPC .................................... *H04R 29/00* (2013.01)

(58) Field of Classification Search
CPC .............................. H04R 29/00; H04R 29/001
USPC ...................................................... 381/58–59
See application file for complete search history.

(56) References Cited

U.S. PATENT DOCUMENTS 4,586,194 A * 4/1986 Kohashi ............... H04R 29/001 381/60
2015/0003649 A1* 1/2015 Horbach ................ H04R 29/00 381/309
2015/0341733 A1* 11/2015 Ikeda .................. H04R 29/001 381/59
2016/0212539 A1* 7/2016 Ikeda ..................... G01H 11/08
2021/0329394 A1* 10/2021 Hansen .................. H04R 29/00

OTHER PUBLICATIONS

Welti, Improved Measurement of Leakage Effects for Circum-Aural and Supra-Aural Headphones, Audio Engineering Society Convention Paper, Presented at the 138th Convention, May 7-10, 2015, Warsaw, Poland, 10 pages.

* cited by examiner

*Primary Examiner* — Katherine A Faley
(74) *Attorney, Agent, or Firm* — Burris Law, PLLC

(57) ABSTRACT

An apparatus for testing an earpiece of a headphone includes an insert configured to be connected to a head-shaped fixture. The insert has an inner side and an outer side that is opposite the inner side. The outer side is configured to engage the earpiece. The insert defines at least one fluid pocket. The fluid pocket is located between the inner side and the outer side and has a fluid sealed therein. The fluid within the fluid pocket is configured to impart a stiffness that varies based on a force applied to the outer side of the insert by the earpiece.

20 Claims, 5 Drawing Sheets

APPARATUS HAVING AN INSERT FOR TESTING AN EARPIECE OF A HEADPHONE

FIELD

The present disclosure relates to testing an earpiece of a headphone. More specifically, the present disclosure relates to an apparatus having an insert for testing an earpiece of a headphone.

BACKGROUND

The statements in this section merely provide background information related to the present disclosure and may not constitute prior art.

Commercial dummy heads and related fixtures (herein referred to as "fixtures") often do not emulate how headphones fit on real humans, resulting in large audio leaks in the dummy head which do not correspond to leakage in a typical human head. This results in errors in measurement at low frequencies. These errors can be very large, easily 10 dB or more over a broad band of frequencies from 20 to 500 Hz. The cause of these errors is related to the dummy head shape and rigidity because the dummy heads typically are rigid, except for the pinna. Accordingly, the headphones do not settle fully on the fixture.

Headphone leakage effects can have a profound effect on low frequency performance of headphones. Deviations of 20 dB or more in the headphone response can easily result from varying amounts of leakage. For many headphone designs, leakage is still the largest source of variability in perceived low frequency response. Reducing this variability would be the best solution for this problem.

Accordingly, fixtures that more accurately approximates the fitting of headphones on human subjects are desirable.

SUMMARY

This section provides a general summary of the disclosure and is not a comprehensive disclosure of its full scope or all of its features.

In one form, the present disclosure provides an apparatus for testing an earpiece of a headphone. The apparatus includes an insert configured to be connected to a head-shaped fixture. The insert has an inner side and an outer side that is opposite the inner side. The outer side being configured to engage the earpiece. The insert defines at least one fluid pocket. The fluid pocket is located between the inner side and the outer side and has a fluid sealed therein. The fluid within the at least one fluid pocket is configured to impart a stiffness that varies based on a force applied to the outer side of the insert by the earpiece.

In variations of the apparatus of the above paragraph, which can be implemented individually or in any combination: the insert has a variable thickness from the inner side to the outer side; the insert is made of a silicone material; the fluid is a non-Newtonian fluid; the fluid pocket comprises a plurality of fluid pockets spaced apart from each other in an arcuate pattern within the insert; the fluid pocket is partially defined by first and second internal surfaces, a distance between the first and second internal surfaces increases such that the fluid pocket widens towards the outer side; the insert defines an opening that is configured to receive a pinna of the head-shaped fixture, the fluid pocket is located between the opening and a periphery of the insert; the fluid pocket has an arcuate shape; the inner side of the insert defines an annular groove recessed from an innermost surface of the inner side, the fluid pocket opens through to the annular groove; a coupler is disposed within the annular groove and is configured to secure the insert to the head-shaped fixture, the coupler sealing the fluid pocket to inhibit fluid from escaping the fluid pocket; and a coupler attached to the inner side of the insert and configured to secure the insert to the head-shape fixture.

In another form, the present disclosure provides an apparatus for testing an earpiece of a headphone. The apparatus includes an insert configured to be connected to a head-shaped fixture. The insert has an inner side and an outer side that is opposite the inner side. The insert defines an opening that is configured to receive a pinna of the head-shaped fixture such that the outer side is configured to engage the earpiece in a test position that covers the pinna. The insert also defines a plurality of fluid pockets that are spaced apart from each other and that are located between the inner side of the insert and the outer side of the insert. Each fluid pocket of the plurality of fluid pockets has a non-Newtonian fluid contained therein. Each fluid pocket of the plurality of fluid pockets being positioned about the opening in corresponding positions configured to align with the earpiece in the test position.

In variations of the apparatus of the above paragraph, which can be implemented individually or in any combination: the plurality of fluid pockets are arranged in an arcuate pattern about the opening; each fluid pocket of the plurality of fluid pockets is partially defined by first and second internal surfaces of the insert, a distance between the first and second internal surfaces increases such that the fluid pocket widens towards the outer side of the insert; each fluid pocket of the plurality of fluid pockets has an arcuate shape; the inner side of the insert defines an annular groove, the plurality of fluid pockets open through to the annular groove; a coupler is disposed within the annular groove and seals the plurality of fluid pockets to inhibit fluid from escaping the fluid pockets; further including the head-shape fixture, the insert at least partially disposed within the fixture; and the fixture is made of a first material and the insert is made of a second material that is different from the first material.

In yet another form, the present disclosure provides an apparatus for testing an earpiece of a headphone. The apparatus includes a fixture, an insert, and a coupler. The fixture includes a pinna. The insert is at least partially disposed within the fixture and has an inner side and an outer side that is opposite the inner side. The insert defines an opening that is configured to receive the pinna of the fixture such that the outer side is configured to engage the earpiece in a test position that covers the pinna. The insert also defines a plurality of fluid pockets that are spaced apart from each other and that are located between the inner side of the insert and the outer side of the insert. Each fluid pocket of the plurality of fluid pockets has a non-Newtonian fluid contained therein. Each fluid pocket of the plurality of fluid pockets are positioned about the opening in an arcuate pattern configured to align with the earpiece in the test position. The coupler is located at the inner side of the insert and attaches the insert to the fixture.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
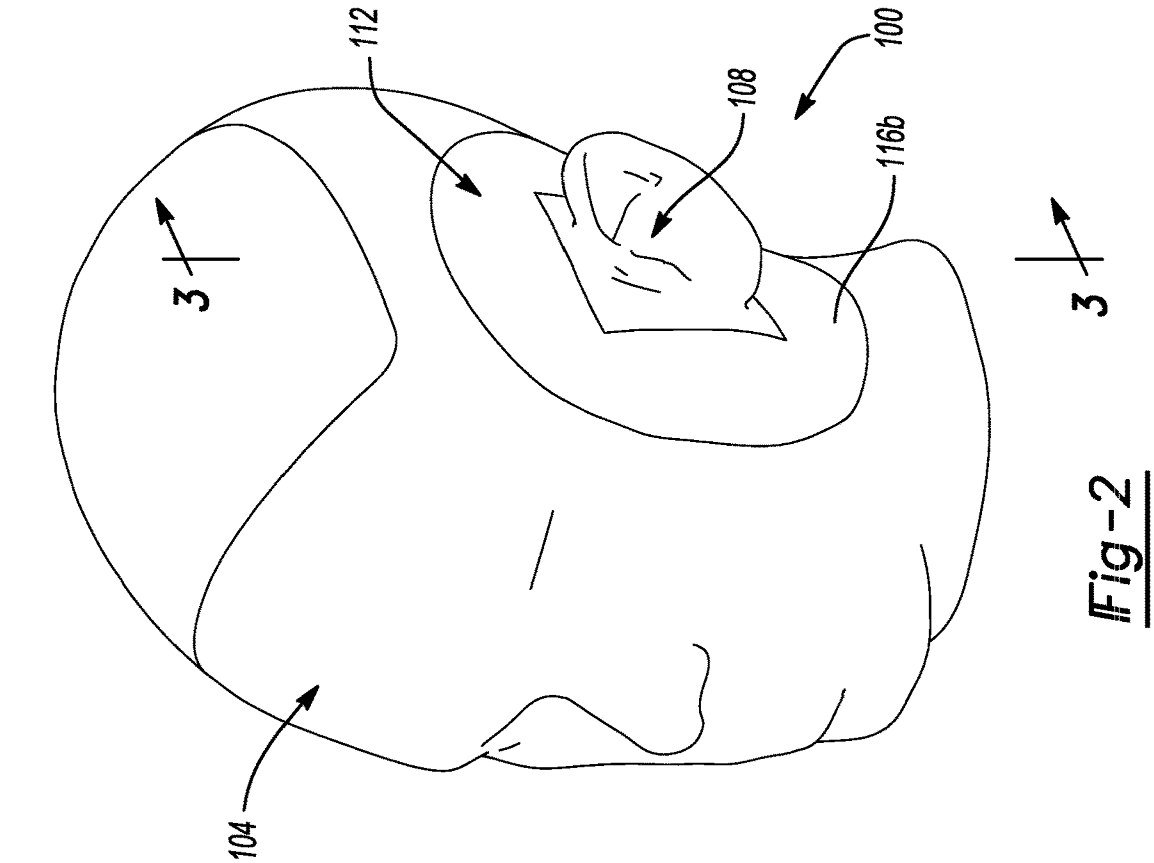
FIG. 2 is a perspective view of an apparatus coupled to the head shaped fixture and including an insert in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present disclosure, an apparatus for testing an earpiece of a headphone is provided. The apparatus includes an insert configured to be connected to a head-shape fixture. The insert has an inner side and an outer side that is opposite the inner side. The outer side being configured to engage the earpiece. The insert defines one or more fluid pockets that are located between the inner side of the insert and the outer side of the insert. The fluid pockets contained a fluid sealed therein. The fluid within the fluid pockets is configured to impart a stiffness that varies based on a force applied to the outer side of the insert by the earpiece. In this way, the head-shape fixture more accurately represents headphones being fitted on a human head.

Figure 1:
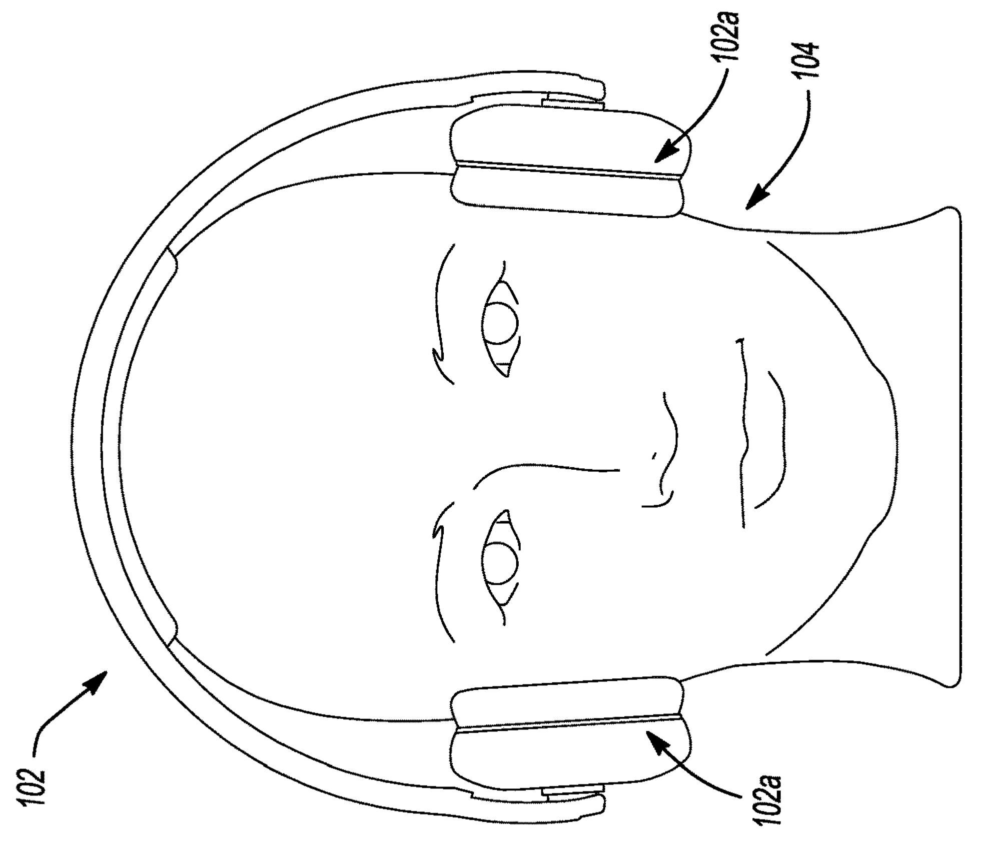
FIG. 1 is a front view of a head shaped fixture having headphones disposed thereon in accordance with the teachings of the present disclosure.
Figure 3:
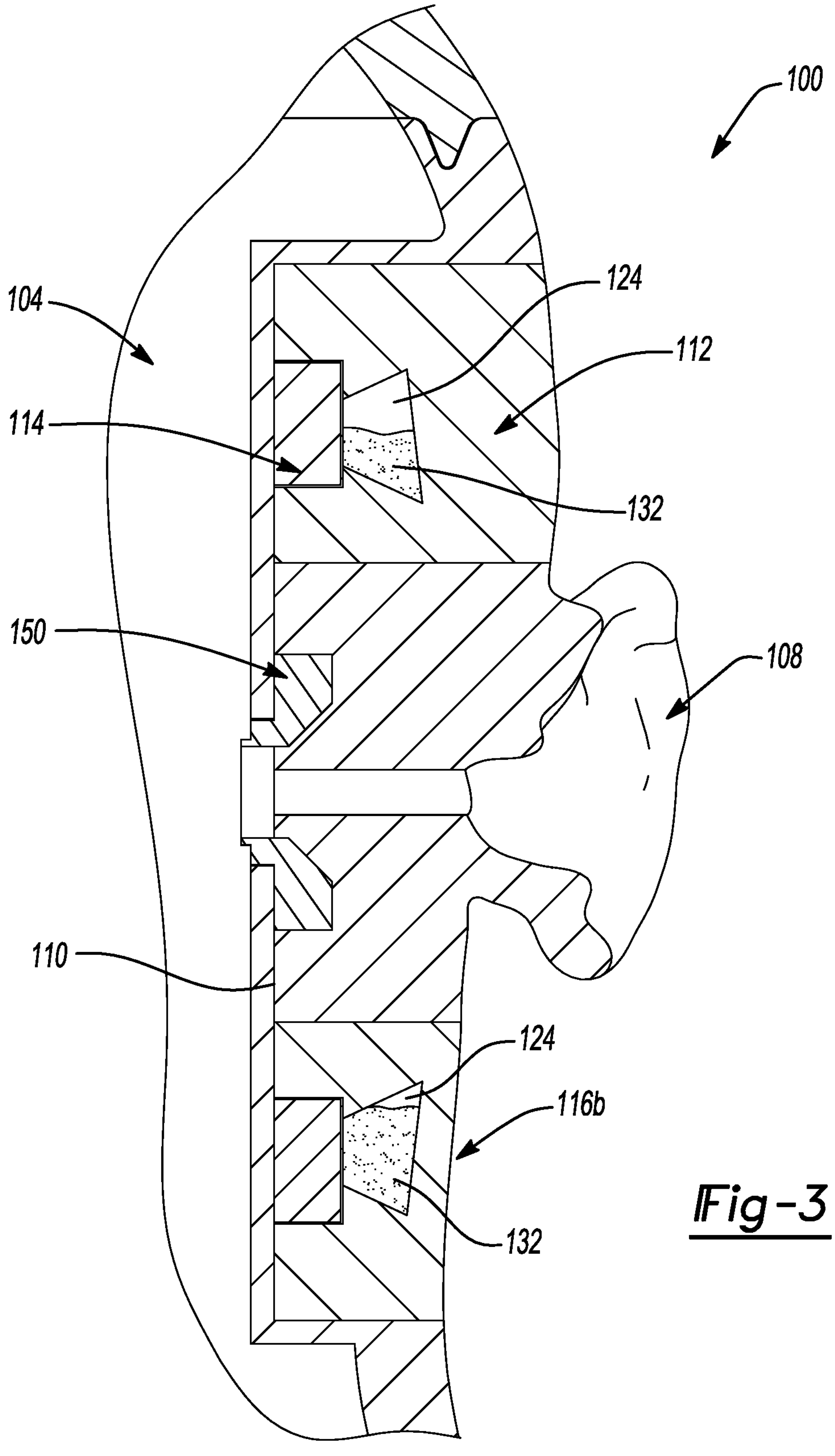
FIG. 3 is a cross-sectional view of the apparatus taken along line 3-3 in FIG. 2.

Referring now to FIGS. 1-3, an apparatus 100 for testing an earpiece 102*a* of the headphones 102 disposed on a head-shaped fixture 104 is provided. The fixture 104 in accordance with the teachings of the present disclosure emulates the shape and contours of a human head and includes a pair of grooves (not specifically shown) where the apparatus 100 is securely received. In the example illustrated, the head-shaped fixture 104 is a mannequin. In one or more embodiments, the grooves of the fixture 104 may have a circular or oval shape. In other embodiments, the grooves of the fixture 104 may include a square shape, a rectangular shape, or any other suitable shape that is configured to receive the apparatus 100. The fixture 104 may be made of a rigid material such as plastic or fiberglass, for example.

As shown in FIGS. 2 and 3, a pinna 108 is disposed in a respective groove and secured to a back wall 110 defining the respective groove. In one or more embodiments, the pinna 108 is secured to the back wall 110 using fasteners (not specifically shown) such as rivets, screws, or bolts, for example. In one or more embodiments, the pinna 108 is secured to the back wall 110 using an adhesive or any other suitable attachment means. The pinna 108 is made of a material that is different from the fixture 104. That is, the pinna 108 may be made of a soft material to represent the pinna of a human such a silicon material. The pinna 108 may be covered at least partially by the earpiece 102*a* when the headphones 102 are disposed on the fixture 104. In one or more embodiments, the pinna 108 may be covered entirely by the earpiece 102*a* when the headphones 102 are disposed on the fixture 104.

Figure 4:
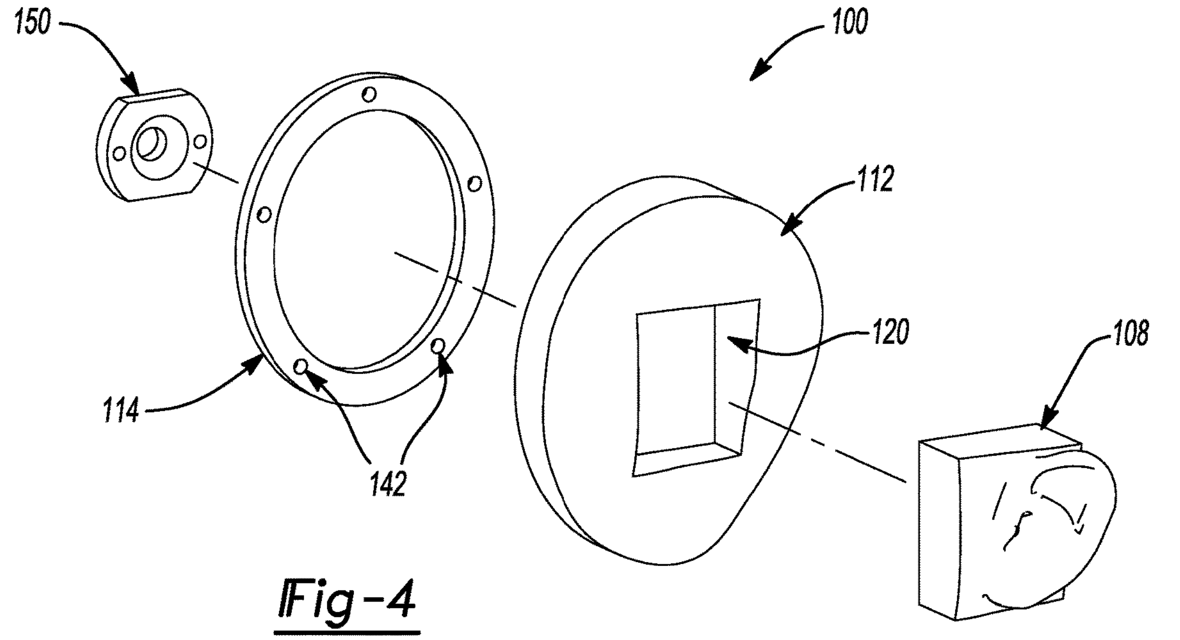
FIG. 4 is an exploded view of the apparatus shown in FIG. 2 in accordance with the teachings of the present disclosure.
Figure 6:
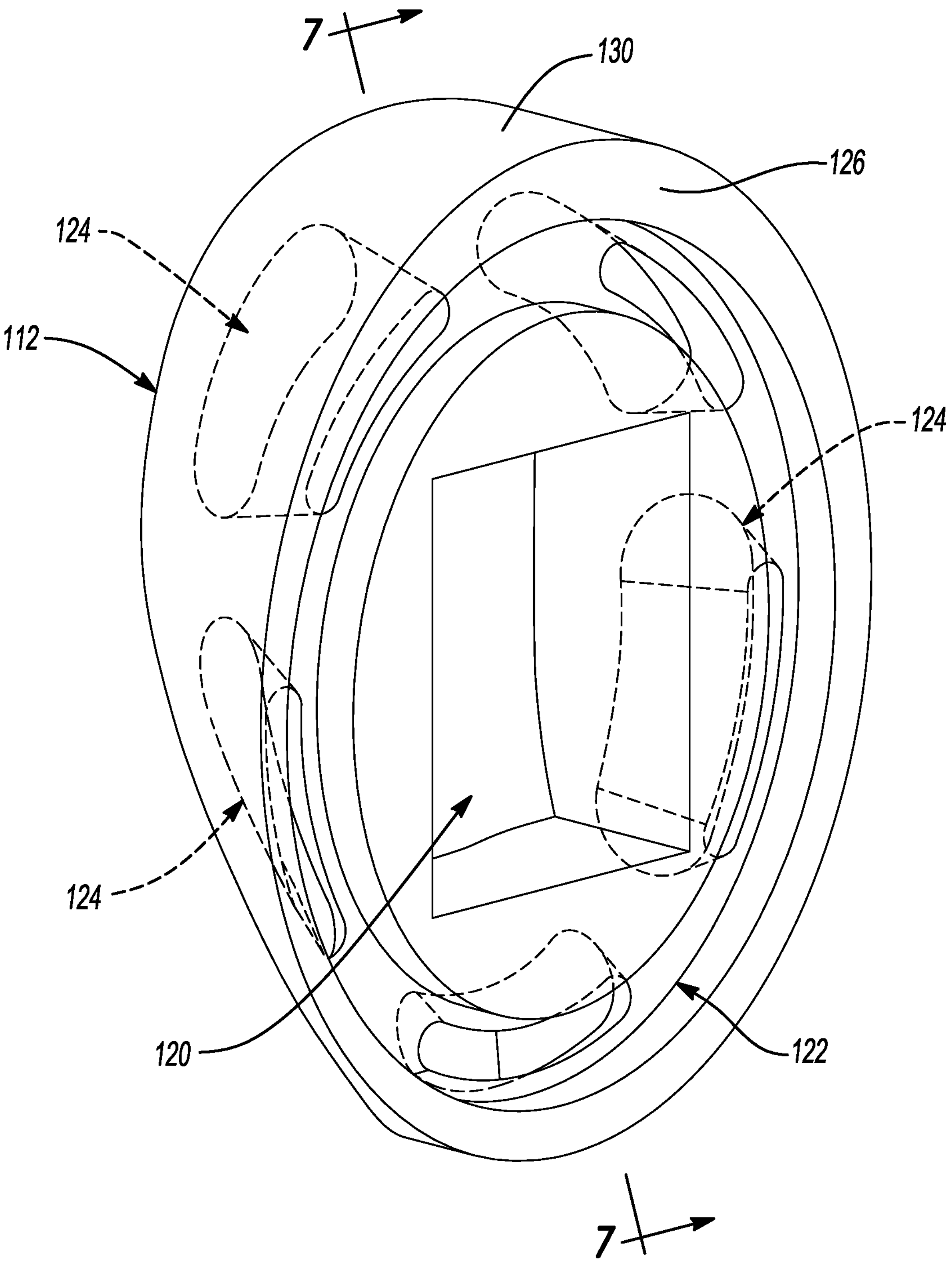
FIG. 6 is a perspective view of an insert of the apparatus shown in FIG. 2.

With reference to FIGS. 3, 4, and 6, the apparatus 100 includes an insert 112 and a coupler 114. In one or more embodiments, the insert 112 has a shape that corresponds to a shape of the respective groove in which the insert 112 is securely received. The insert 112 also includes an inner side 116*a* and an outer side 116*b* that is opposite the inner side 116*a* and that engages the earpiece 102*a* of the headphone 102. The insert 112 is large enough to accommodate the headphones 102 (e.g., on-ear headphone sitting at least partially on the outer side 116*b* of the insert 112). In some forms, the earpiece 102*a* of the headphones 102 sits entirely on the outer side 116*b* of the insert 112 (i.e., the earpieces 102*a* of the headphones 102 do not sit on the fixture 104 and instead sit entirely on or rest against the outer side 116*b* of the insert 112). In the example illustrated, the insert 112 has an oval shape that corresponds to an oval shape of the respective groove of the fixture 104. In some forms, the insert 112 may have a square shape that corresponds to a square shape of the respective groove of the fixture 104. In one or more embodiments, the insert 112 has sections or portions having different thicknesses. For example, an upper portion of the insert 112 has a thickness that is greater than a thickness of a lower portion of the insert 112. In this way, the insert 112 has a variable thickness.

The insert 112 may be made of a material that is pliable and/or resilient. Materials such as gels (e.g., silicone rubber gels or platinum silicone rubber gels) are sufficiently soft, pliable, resilient and allow controlled and repeatable properties to be incorporated in the insert design. In one or more embodiments, the insert 112 may be made of a gel or any similar material with a Shore hardness in the range of about 000-34, for example. The insert 112 is disposed within the respective groove of the fixture 104 and is secured to the fixture 104 so as to maintain the original shape of the head (with no headphones present) while emulating its physical properties. Additionally, the user is allowed to change out the insert 112 for a version with different properties if desired. Stated differently, the insert 112 is interchangeable or removably secured to the fixture 104. In this way, one fixture 104 may be used with a plurality of different inserts.

In the example illustrated, the insert 112 is made of a single body. In one or more embodiments, the insert 112 may be made of two or more bodies that are secured to each other. The bodies may have different rigidities or stiffnesses such that the insert has a variable stiffness throughout to emulate physical properties of the human head at different locations around the ear. For example, a portion of the insert 112 representing a cheek bone of a human, which is directly in front of the pinna 108, may be made of a gel material, since this area in humans has less bone matter and is thus soft. On the other hand, a portion of the insert 112 representing a mastoid process (i.e., the bony part of the skull behind the ear), which is below and slightly to the rear of the pinna 108, utilizes a stiffer or more rigid material such as silicone. The configuration of the insert 112 takes into account the physiology of a range of human skulls.

With additional reference to FIGS. 4-7, the insert 112 defines an opening 120, an annular groove 122, and a plurality of fluid pockets 124. The opening 120 extends from the inner side 116*a* of the insert 112 to the outer side 116*b* of the insert 112 and receives the pinna 108. In the example illustrated, the opening 120 is located near or at a center portion of the insert 112 and has a generally square shape. In some forms, the opening 120 may have an oval shape or any other suitable shape that corresponds to the shape of a body of the pinna 108. The inner side 116*a* of the insert 112 includes an innermost surface 126, and the annular groove 122 is recessed toward the outer side 116*b* from the innermost surface 126 and surrounds the opening 120.

Figure 7:
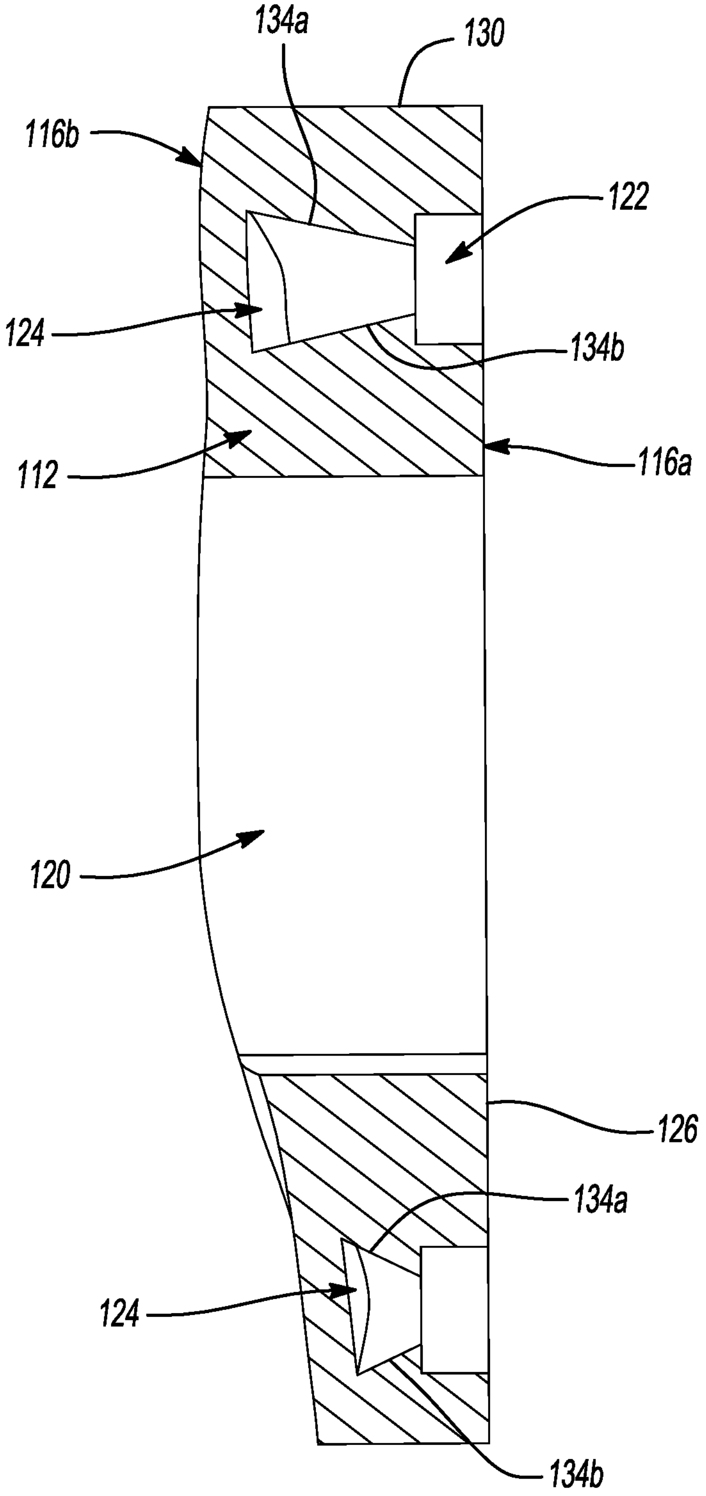
FIG. 7 is a cross sectional view of the insert in accordance with the teachings of the present disclosure.

With reference to FIGS. 6 and 7, the plurality of fluid pockets 124 are located between the opening 120 and a periphery 130 of the insert 112, and located between the inner side 116*a* of the insert 112 and the outer side 116*b* of the insert 112. The plurality of fluid pockets 124 are spaced apart from each other within the insert 112. In the example illustrated, the plurality of fluid pockets 124 may be spaced apart from each other in an arcuate pattern within the insert 112. In one or more embodiments, the plurality of fluid pockets 124 may be spaced apart from each other in another predetermined pattern. In the example illustrated, each fluid pocket 124 may have an arcuate shape. In one or more embodiments, the shape of the fluid pocket 124 may be linear, circular, or any other suitable shape.

Each fluid pocket 124 opens through to the annular groove 122. In this way, a fluid 132 (FIG. 3) may be introduced to the fluid pockets 124. The fluid 132 within the fluid pockets 124 may be configured to impart a stiffness that varies based on a force of stiffness applied to the insert 112 (e.g., applied to the outer side 116*b* of the insert 112 by the headphones 102). In one or more embodiments, the fluid 132 may be a non-Newtonian fluid for example, which has variable viscosity dependent on stress. That is, the viscosity in a non-Newtonian fluid can change when under force or stress to either more liquid or more solid. In one or more embodiments, the fluid 132 may be a fluid that includes a shear thickening behavior where the viscosity increases with increased stress. An example of such fluid can include Oobleck or a corn flour and water solution. In this way, when the headphones 102 are located on the insert 112, regions of the insert 112 including the fluid pockets 124 containing the fluid 132 may be stiffer than regions of the insert 112 not having the fluid pockets 124 containing the fluid 132 (i.e., regions of the insert 112 where only the material of the insert 112 is present). This gives the insert 112 a variable stiffness throughout to emulate physical properties of the human head at different locations around the ear.

In one or more embodiments, the fluid pockets 124 may have a predetermined shape, size and/or volume of fluid 132 to emulate the stiffness of the pinna of a human in that given area. That is, the shape of the fluid pockets 124 may be different from each other, the size of the fluid pockets 124 may be different from each other, and/or the volume of fluid 132 within each fluid pocket 124 may be different. In one or more embodiments, the shape of the fluid pockets 124 within the insert 112 may be the same, the size of the fluid pockets 124 within the insert 112 may be the same, and/or the volume of fluid 132 within each fluid pocket 124 within the insert 112 may be the same.

Each fluid pocket 124 is partially defined by first and second internal surfaces 134*a*, 134*b* of the insert 112 that are opposed from each other. In one or more embodiments, a distance between the first and second internal surfaces 134*a*, 134*b* increases such that the fluid pocket 124 widens towards the outer side 116*b*. Stated differently, the distance between the first and second internal surfaces 134*a*, 134*b* increases from the inner side 116*a* toward the outer side 116*b* such that an area of the fluid pocket 124 near the outer side 116*b* of the insert 112 is greater than an area of the fluid pocket 124 near the inner side 116*a* of the insert 112. In this way, a force or stiffness applied by the headphones 102 onto the area of the fluid pocket 124 near the outer side 116*b* of the insert 112 permits a stiffness to be imparted that is different (e.g. greater) than the stiffness of the insert 112.

Figure 5:
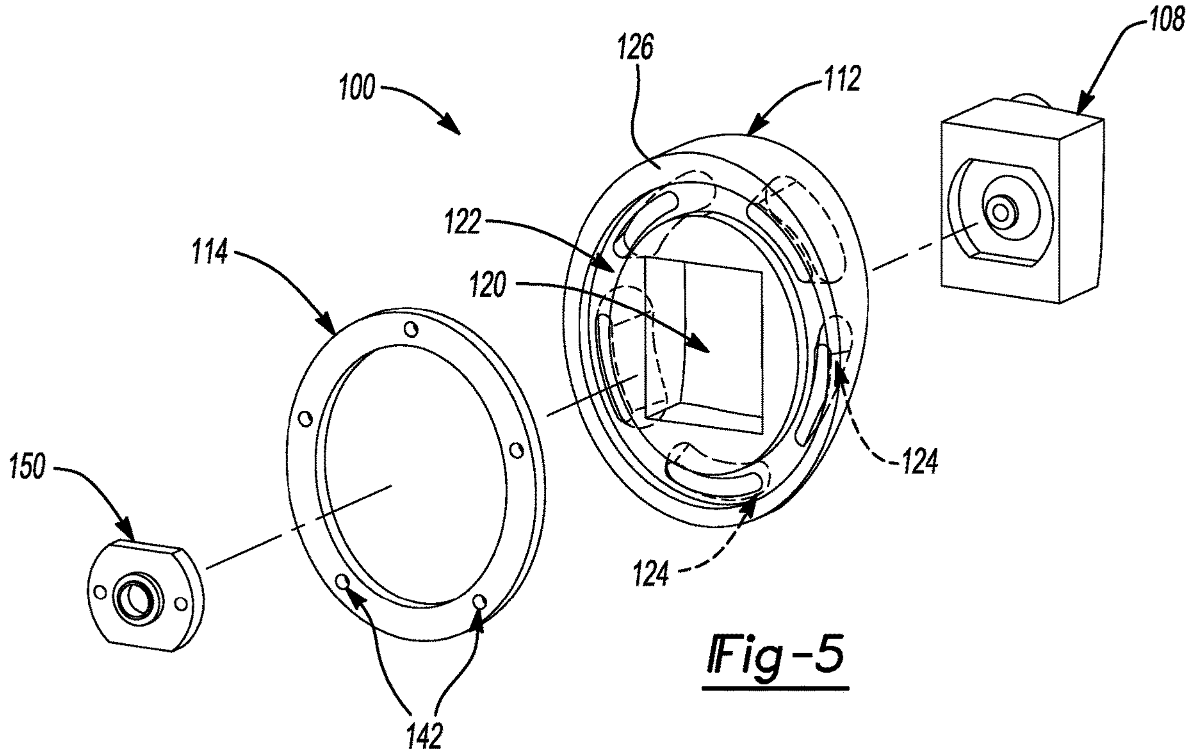
FIG. 5 is another exploded view of the apparatus shown in FIG. 2.

With reference to FIGS. 3-5, the coupler 114 attaches the insert 112 to the back wall 110 of the fixture 104. That is, the coupler 114 is securely received in the annular groove 122 of the insert 112 and is secured to the back wall 110 of the fixture 104 using fasteners (not shown) extending through the coupler 114 and the back wall 110. The fasteners may include bolts, screws, rivets, pins, or any other suitable attachment structure that can attach the coupler 114 to the back wall 110. The coupler 114 includes a shape that corresponds to the shape of the groove 122. In this way, the coupler 114 may be received in the groove 122 and may seal the fluid 132 within the fluid pockets 124. In one or more embodiments, the inner side 116*a* of the insert 112 may have an over mold to further inhibit the fluid 132 within the fluid pockets 124 from escaping. In the example illustrated, the coupler 114 includes apertures 142 extending therethrough. The fasteners may extend through the apertures 142 in the coupler 114 and apertures (not shown) in the back wall 110, thereby securing the insert 112 and the coupler 114 to the fixture 104. In one or more embodiments, the coupler 114 may include protrusions (not shown) that extend into the apertures in the back wall 110 to secure the insert 112 and the coupler 114 to the fixture 104.

A microphone 150 (FIGS. 3-5) may be located near or adjacent the back wall 110 between the back wall 110 and the pinna 108. The microphone 150 may receive audio signals from the headphones 102 placed on the fixture 104 and may transmit the audio signals to a controller (not shown) for further processing. The microphone 150 may also be surrounded by the insert 112.

The insert 112 having a variable thickness and/or stiffness provides for a more accurate representation of the human head near the ear area, which allows for the headphones 102 to settle on the fixture 104. In this way, regulation of the leakage of the headphones 102 is improved. The insert 112 of the present disclosure including fluid pockets 124 containing a non-Newtonian fluid 132 provides for the insert 112 having a variable stiffness to emulate physical properties of the human head at predetermined locations around the ear.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for testing an earpiece of a headphone, the apparatus comprising:
- an insert configured to be connected to a head-shaped fixture, the insert having an inner side and an outer side that is opposite the inner side, the outer side being configured to engage the earpiece, the insert defining at least one fluid pocket, the at least one fluid pocket is located between the inner side and the outer side and has a fluid sealed therein,
- wherein the fluid within the at least one fluid pocket is configured to impart a stiffness that varies based on a force applied to the outer side of the insert by the earpiece.

2. The apparatus of claim 1, wherein the insert has a variable thickness from the inner side to the outer side.

3. The apparatus of claim 1, wherein the insert is made of a silicone material.

4. The apparatus of claim 1, wherein the fluid is a non-Newtonian fluid.

5. The apparatus of claim 1, wherein the at least one fluid pocket comprises a plurality of fluid pockets spaced apart from each other in an arcuate pattern within the insert.

6. The apparatus of claim 1, wherein the at least one fluid pocket is partially defined by first and second internal surfaces, and wherein a distance between the first and second internal surfaces increases such that the at least one fluid pocket widens towards the outer side.

7. The apparatus of claim 1, wherein the insert defines an opening that is configured to receive a pinna of the head-shaped fixture, and wherein the at least one fluid pocket is located between the opening and a periphery of the insert.

8. The apparatus of claim 1, wherein the at least one fluid pocket has an arcuate shape.

9. The apparatus of claim 1, wherein the inner side of the insert defines an annular groove recessed from an innermost surface of the inner side, and wherein the at least one fluid pocket opens through to the annular groove.

10. The apparatus of claim 9, further comprising a coupler disposed within the annular groove and configured to secure the insert to the head-shaped fixture, the coupler sealing the at least one fluid pocket to inhibit fluid from escaping the at least one fluid pocket.

11. The apparatus of claim 1, further comprising a coupler attached to the inner side of the insert and configured to secure the insert to the head-shape fixture.

12. An apparatus for testing an earpiece of a headphone, the apparatus comprising:
- an insert configured to be connected to a head-shaped fixture, the insert having an inner side and an outer side that is opposite the inner side, the insert defining an opening that is configured to receive a pinna of the head-shaped fixture such that the outer side is configured to engage the earpiece in a test position that covers the pinna, the insert also defining a plurality of fluid pockets that are spaced apart from each other and that are located between the inner side of the insert and the outer side of the insert, each fluid pocket of the plurality of fluid pockets has a non-Newtonian fluid contained therein, each fluid pocket of the plurality of fluid pockets being positioned about the opening in corresponding positions configured to align with the earpiece in the test position.

13. The apparatus of claim 12, wherein the plurality of fluid pockets are arranged in an arcuate pattern about the opening.

14. The apparatus of claim 12, wherein each fluid pocket of the plurality of fluid pockets is partially defined by first and second internal surfaces of the insert, and wherein a distance between the first and second internal surfaces increases such that the fluid pocket widens towards the outer side of the insert.

15. The apparatus of claim 12, wherein each fluid pocket of the plurality of fluid pockets has an arcuate shape.

16. The apparatus of claim 12, wherein the inner side of the insert defines an annular groove, and wherein the plurality of fluid pockets open through to the annular groove.

17. The apparatus of claim 16, further comprising a coupler disposed within the annular groove and sealing the plurality of fluid pockets to inhibit fluid from escaping the fluid pockets.

18. The apparatus of claim 12, further comprising the head-shape fixture, the insert at least partially disposed within the fixture.

19. The apparatus of claim 18, wherein the fixture is made of a first material and the insert is made of a second material that is different from the first material.

20. An apparatus for testing an earpiece of a headphone, the apparatus comprising:
- a fixture including a pinna;
- an insert at least partially disposed within the fixture and having an inner side and an outer side that is opposite the inner side, the insert defining an opening that is configured to receive the pinna of the fixture such that the outer side is configured to engage the earpiece in a test position that covers the pinna, the insert also defining a plurality of fluid pockets that are spaced apart from each other and that are located between the inner side of the insert and the outer side of the insert, each fluid pocket of the plurality of fluid pockets has a non-Newtonian fluid contained therein, each fluid pocket of the plurality of fluid pockets being positioned about the opening in an arcuate pattern configured to align with the earpiece in the test position; and a coupler located at the inner side of the insert and attaching the insert to the fixture.

* * * * *